United States Patent [19]

Delignieres

[11] Patent Number: 5,001,926
[45] Date of Patent: Mar. 26, 1991

[54] DEVICE FOR DETERMINING THE VERTICAL DISTANCE BETWEEN TWO ELEMENTS AT UNEQUAL HEIGHTS

[75] Inventor: Robert Delignieres, Mareil-Marly, France

[73] Assignee: Institut Francais du Petrole, Rueil Malmaison, France

[21] Appl. No.: 433,955

[22] Filed: Nov. 9, 1989

[30] Foreign Application Priority Data

Nov. 10, 1988 [FR] France .............................. 88 14731

[51] Int. Cl.⁵ .............................................. G01C 5/04
[52] U.S. Cl. .................................. 73/170 A; 73/865.2; 33/367
[58] Field of Search ........................... 73/170 A, 865.2; 33/367

[56] References Cited

U.S. PATENT DOCUMENTS

| | | |
|---|---|---|
| 3,815,423 | 6/1974 | Gearhart ............................ 73/865.2 |
| 4,218,919 | 8/1980 | Stephenson et al. ............... 73/865.2 |
| 4,397,099 | 8/1983 | Gaucher et al. ...................... 33/367 |

Primary Examiner—Charles A. Ruehl
Attorney, Agent, or Firm—Antonelli, Terry, Stout & Kraus

[57] ABSTRACT

A device for measuring the pressure difference between the two ends of at least one flexible tube connecting together the positions occupied by two elements. In a preferred embodiment, to a summing circuit are applied the signals delivered by two differential pressure sensors disposed respectively at the two positions and to which are applied the pressures prevailing in two flexible tubes, one containing a fluid of a density greater than that of air and the other containing air, these two tubes joining together the respective inputs of the two sensors. An accumulator maintains the static pressures prevailing in both tubes equal. The device is accurate and practically insensitive to temperature variations and accelerations.

6 Claims, 2 Drawing Sheets

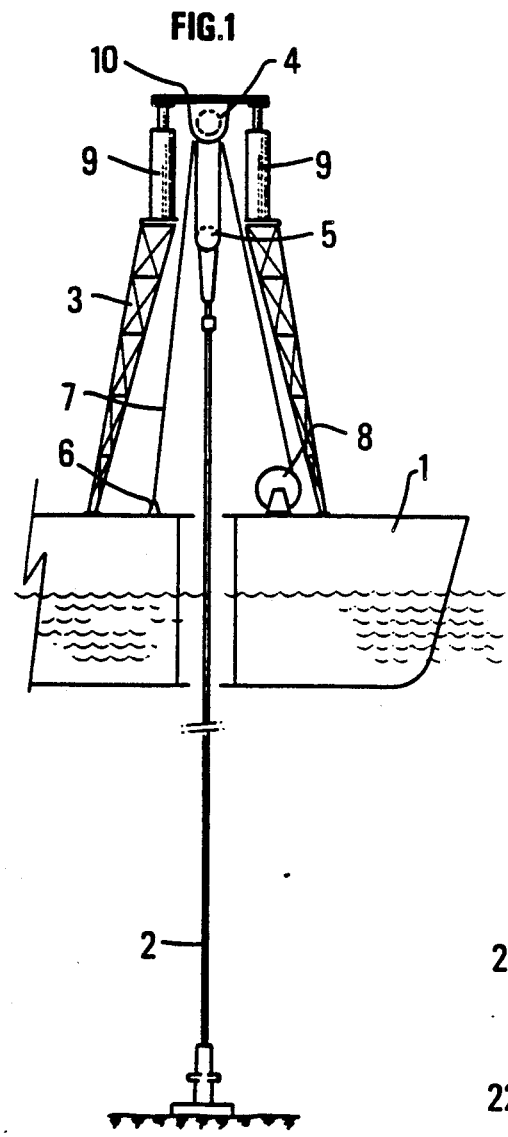
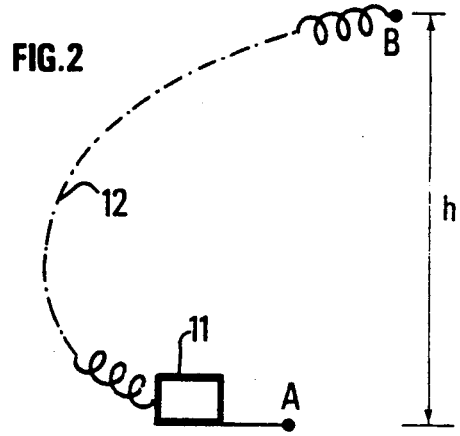
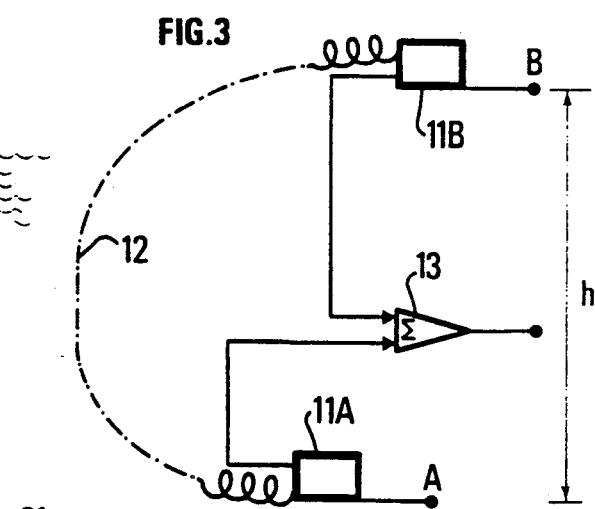
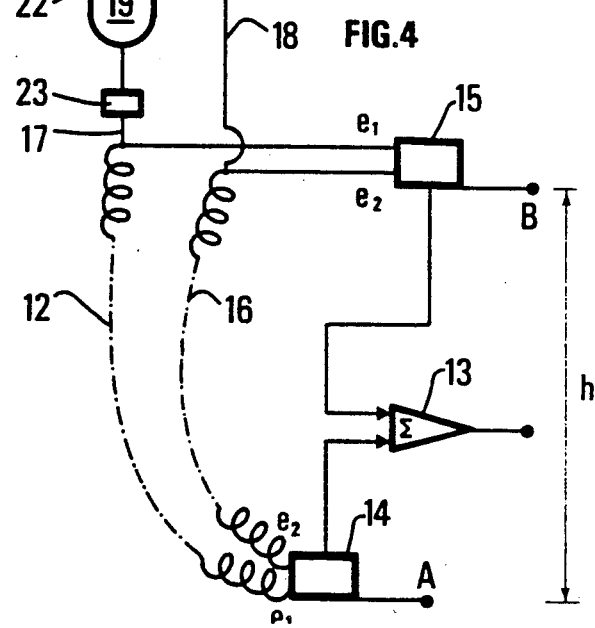

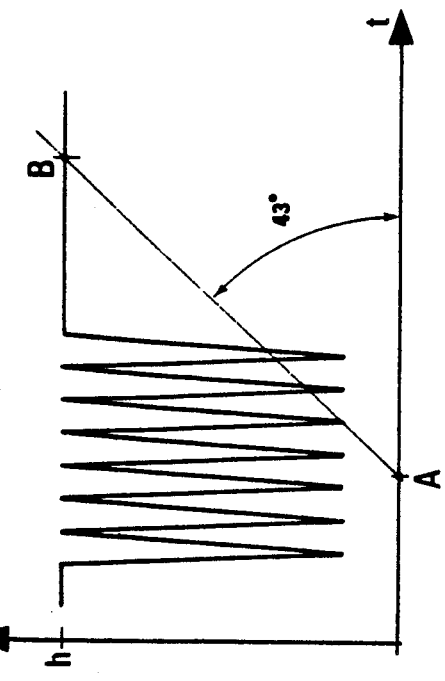
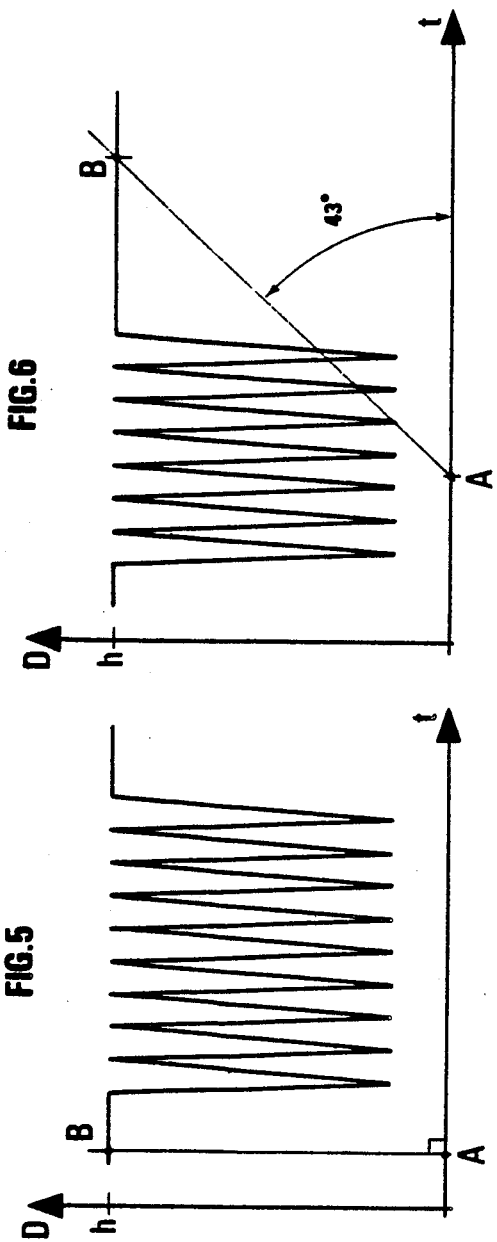
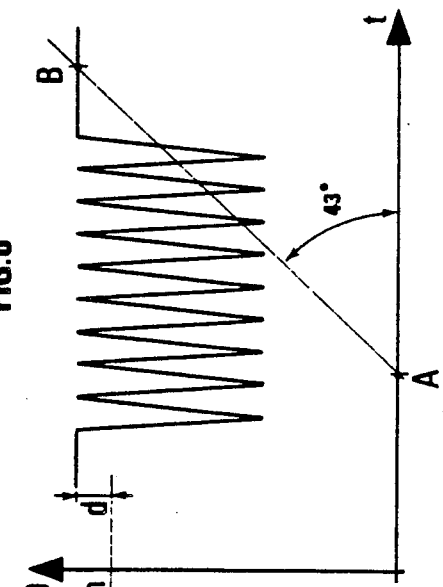
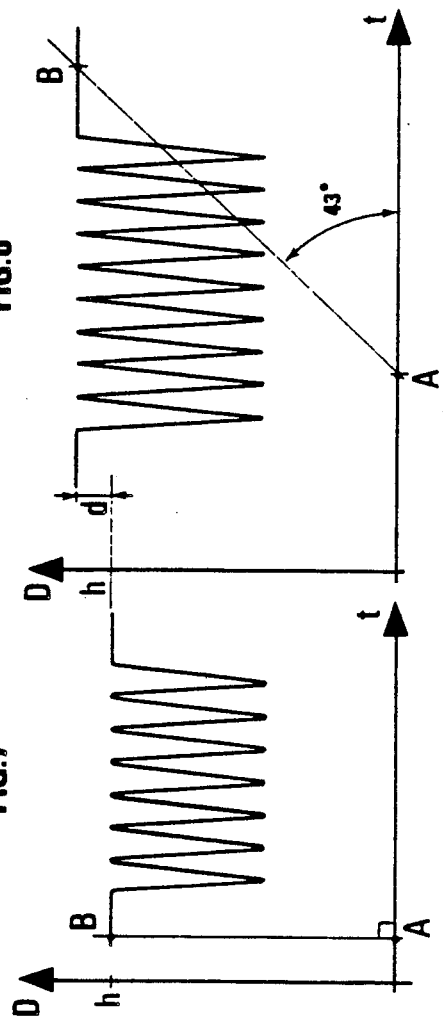

DEVICE FOR DETERMINING THE VERTICAL DISTANCE BETWEEN TWO ELEMENTS AT UNEQUAL HEIGHTS

BACKGROUND OF THE INVENTION

1. Field of the Invention

The present invention relates to a device for measuring the vertical distance between at least two elements. A possible application for the device of the invention is the measurement of the variations of the vertical distance between a position on a floating installation and a mobile element. Among the possible applications of the device may, for example, be the control of an anti-heave system for a floating installation, such as is used in oil drilling ships or in marine engineering operations.

2. Description of the Prior Art

The distance between two points movable with respect to each other may be measured by installing a physical connection therebetween. A stretched wire, chain, or rack is possible for short distances, measuring the variations of the length of this connection. This is an inexpensive solution, but it is difficult to use when the distance is great, because of the deformation of the wire or chain, or when the installation of a physical connection hinders the operation of the mobile elements and restricts their freedom of movement.

Distance measurements may also be made without a physical connection by means of telemeters. Generally, these are discontinuous measurements made at time intervals spaced more or less apart depending on the rate of variation of the distances to be measured, by means of acoustic pulses.

Acoustic telemetry, which consists in measuring the propagation time of acoustic waves over the distance in question, is used in numerous fields: positioning at sea with respect to immersed points, measurement of the level of liquids and particularly that of the height of water under a ship by means of sonars etc, or in photography for adjusting the focussing of picture taking apparatus.

The distances may also be measured by means of electromagnetic waves. The devices used are radar or radio-altimeters. In the field of optical frequencies, laser telemeters are also known which provide a very high accuracy.

The above mentioned devices are generally poorly adapted in all cases where it is desired to determine a vertical distance between two points which are not on the same vertical and are driven with complex movements with respect to each other.

This is the case more particularly on floating installations where an anti-heave system maintains, at a substantially constant altitude with respect to the bottom of the mass of water, a crown block supporting, for example drilling equipment. In order to be able to control the correct operation of the anti-heave system, it is necessary to accurately know the variations of altitude of the stabilized crown block and also the variations of the vertical distance which separates it from any point related to the floating installation.

In French patent application EN 88/02.501 a device is described for measuring the altitude variations of a floating installation. The vertical distance between the stabilized crown block and the reference point on the floating installation may be calculated from direct measurements between these two positions using a telemeter of any type. But this is only possible if the telemetric measurements are corrected by taking into account the attitude variations of the floating installation determined by a device of known type for measuring the angular deviations with respect to the vertical. The assembly may deliver accurate measurements but its cost is generally very high.

The principle of measuring a vertical deviation between two points, by measuring the differential pressure at both ends of a flexible pipe filled with fluid and disposed between these points, has already been used. The problem to be solved is to obtain good accuracy in the pressure measurements and good compensation of the variations of the static pressure of the fluid under the action of temperature variations.

SUMMARY OF THE INVENTION

The device of the invention makes it possible to obtain with good accuracy the vertical distance between at least two points at unequal heights whatever their respective movements, from pressure measurements.

It comprises pressure sensor means for measuring the variations of the pressure difference between the two ends of a flexible tube filled with a fluid whose density is different from that of air, which connects together said points at unequal heights, these variations of the pressure difference are consecutive on vertical movements of the two positions with respect to each other, and means for converting said pressure variations into vertical distance variations.

It is characterized in that it comprises a second flexible tube filled with gas and in that the sensor means comprise two differential sensors with two inputs, the first one measuring the difference between the pressures prevailing at the first end of the two tubes, the second one measuring the difference between the pressures prevailing at the second end of the two tubes, the device also comprising balancing means for maintaining at a substantially constant value the static pressure difference prevailing between two points respectively of the fluid filled tube and the gas filled tube. The balancing means comprise for example a membrane accumulator for separating the fluid and gas and balancing the variations of their respective static pressures.

The device may comprise a filtering element inserted between the first tube and said membrane accumulator.

The device may also comprise means for summing the measurement signals produced by the two differential sensors.

A first end of the two flexible tubes may be fixed at a first position kept substantially stable in altitude by a heave compensation system associated with a floating installation subjected to the swell, whereas the second end of the two flexible tubes is fixed at a second position subjected to heaving.

The device of the invention makes it possible to measure the difference in vertical distance of two points, whatever their respective movements, at a very much lower cost than that of prior known devices based on different principles. Its accuracy is very good and practically independent of temperature variations and accelerations.

The use of two tubes whose contents are at the same static pressure and maintained at equal pressure by balancing means such as an accumulator, provides good compensation of the temperature effects. Since the differential sensors have only to measure pressure differences which are well compensated for temperature, very sensitive sensors may therefore be used and finer and more accurate measurements obtained.

BRIEF DESCRIPTION OF THE DRAWINGS

Other features and advantages of the device of the invention will be clear from reading the description of several embodiments given by way of non-limitative examples, with reference to the accompanying drawings in which:

FIG. 1 shows schematically an offshore drilling installation in relation with which the device of the invention may be used;

FIG. 2 shows a first embodiment of the device;

FIG. 3 shows a second embodiment of the device;

FIG. 4 shows a third, preferred embodiment of the device;

FIGS. 5 and 6 show that the lateral deviations of the two measuring points have no influence on the result of the measurement of their vertical distance obtained with the device; and FIGS. 7 and 8 show the influence of the same lateral deviations on the result of the distance measurement obtained with a conventional stretched wire sensor.

DESCRIPTION OF THE PREFERRED EMBODIMENTS

The device of the invention may be used, as we have seen, in relation to a system for compensating the heaving undergone by a floating installation such as a ship, under the effect of the movements of the sea, this system making it possible to stabilize the attitude of a support assembly with respect to the bottom of the water.

A floating support 1 for drilling the sea sub-soil such as that shown schematically in FIG. 1, in fact very often comprises a system for preventing the transmission of heaving movements due to the swell to a drill-string 2. The ship carries a derrick 3 to which is fixed an assembly supporting the drill-string comprising two blocks 4, 5. To a fixing element 6 on the ship is attached the end of cables 7 which pass over the pulleys of the two blocks 4,5 and are wound on a winch 8. Any anti-heave system comprises, for example, jacks 9 to the rods of which is fixed a platform 10 having support means for the crown block 4. Oleo-pneumatic means (not shown) make it possible to know or control the sliding of the rods of jacks 9 so as to maintain the crown block 4, and so the string which is suspended therefrom, at a substantially constant altitude with respect to the sea bottom. An improved heave compensation device is described for example in the French patent 2 575 452.

The principle of vertical distance measurement in accordance with the invention consists essentially in connecting together the two positions between which it is desired to make the measurements by a flexible tube at least as long as the largest distance which may separate them in practice during the measurements to be carried out, and in measuring the variations of the pressure exerted on a fluid column contained in the flexible tube when the vertical distance varies.

In the example of use considered, one of the positions chosen is on the crown block 4. The other position is chosen for convenience on the platform 10 or on the derrick 3.

The simplest embodiment (FIG. 2) of the device of the invention comprises a single pressure sensor 11 connected to the lowest end of a flexible tube 12 connecting together the two chosen positions A, B. Tube 12 is filled with a fluid having a density different from, and preferably greater than, that of air. The static pressure $P_S$ which prevails in the tube is known by a previous measurement by placing the two ends of the tube at the same height.

The pressure sensor 11 therefore measures the overpressure dp at the base of the fluid column contained in the tube when it connects the two positions A, B together. This overpressure is due to the fluid mass contained in the tube. If $\rho$, h, g designate respectively the specific mass of the fluid, the vertical distance between points A and B and the acceleration of gravity, the overpressure dp is expressed by the relation:

$$dp = \rho g h \qquad (1)$$

If the tube communicates with the atmosphere at its upper part, the pressure sensor measures the overpressure dp with respect to the atmosphere pressure.

Better results are obtained by using two pressure sensors 11A, 11B disposed respectively at positions A and B (FIG. 3) and by summing the measurements of the two pressure sensors. In fact, when the tube moves so as to follow the variations of distance AB, the fluid inside is subjected to accelerations. The lower sensor 11A measures an instantaneous pressure $PiA = P_S + \rho g h + Pa$, where $P_S$ designates, it will be recalled, the static pressure of the fluid and Pa the overpressure due to the instantaneous acceleration. The upper sensor 11B measures a pressure $PiB = P_S - Pa$, the effect of the acceleration being opposite that measured at the other end of tube 12. By summing the pressures PiA and PiB $$PiA + PiB = 2P_S + \rho g h \qquad (2)$$

the measurement disturbances are eliminated which are due to the accelerations. The summing is carried out in a summing circuit 13 which adds the measurement signals delivered by the two sensors 11A, 11B. With the static pressure $P_S$ known, the value of the overpressure $\rho g h$ and so the vertical distance h, may be derived therefrom.

Measurement of the difference of the two signals PiA and PiB is also possible $$PiA - PiB = \rho g h + 2Pa$$

It is independent of the static pressure $P_S$ but it is disturbed by the effects of accelerations Pa.

In the preferred embodiment (FIG. 4), two differential pressure sensors 14, 15 are used having two inputs and disposed respectively at positions A, B. The two ends of tube 12 filled with fluid at a static pressure $P_S$ are connected to a first input $e_1$, respectively of the two sensors 14, 15. Between the second respective inputs $e_2$ of the two sensors 14, 15 is connected a second tube 16 filled with air at a static pressure $P_S$ identical to that of the fluid in the other tube 12. The top ends of both tubes 12 and 16 are placed in communication, respectively by two ducts 17 and 18, with the opposite compartments 19, 20 of an accumulator 21 of known type. A flexible membrane 22 provides permanent balancing of the pressures in both compartments 19, 20 and so of the static pressures in both tubes 12, 16.

A damping element 23 is inserted in duct 17. It acts as a low pass filter for eliminating the dynamic pressure variations applied to compartment 19. The presence of this element 23 is only justified in practice if pressure sensors are used with a sufficiently rapid response and/or if the pressure losses in tube 12 are sufficiently low.

The first sensor 14 measures at its inputs $e_1$ and $e_2$ respectively pressures $$Pe_1 = P_S + Pa + \rho gh$$

and $$Pe_2 = P_S + \rho' gh + Pa'$$

where
- $\rho$ and $\rho'$ designate the respective specific masses of the fluid and of the air in tubes 12 and 16, and
- Pa and Pa', the instantaneous overpressures due to the accelerations.

Sensor 14 will produce a signal VS1 proportional to $$P_1 = Pe_1 - Pe_2 = (\rho - \rho')gh + Pa - Pa'$$

The second sensor 15, which measures at its respective inputs $e_1$ and $e_2$ the pressures $$Pe_1 = P_S - Pa$$

and $$Pe_2 = P_S - Pa'$$

delivers a signal VS2 proportional to $$p_2 = Pe_1 - Pe_2 = -(Pa - Pa')$$

The signals delivered by the two sensors 14, 15 are also applied to a summing circuit 13 which therefore produces a signal proportional to $$p1 + p2 = (\rho - \rho')gh$$

From this signal the effective vertical distance between the two positions A and B can be derived at any time. The device is practically insensitive to acceleration effects. In addition, permanent balancing of the static pressures in both tubes 12, 16, provided by accumulator 21, results in making the device practically insensitive also to temperature variations. In a variant of the preceding embodiment, compartment 20 of the accumulator containing air communicates with the external medium and so the static pressure $P_S$ is in this case equal to the atmosphere pressure.

Without departing from the scope of the invention, accumulator 21 may be replaced by any means for balancing the respective static pressures in the two tubes or even by causing the upper ends of both tubes 12, 16 to communicate with the atmosphere.

It has been experimentally checked that the vertical distance measurements made using the device of the invention were in no way affected by the lateral deviations of the two measurement positions with respect to each other. It can be seen in FIGS. 5, 6 that the vertical distance h between the two points A and B subjected with respect to each other to a heaving movements of constant amplitude does not change, whether the line AB is vertical (FIG. 5) or is deviated at 43° with respect to the vertical (FIG. 6). Under identical conditions (FIGS. 7,8) an angular deviation of 43° results in a considerable variation (d) of the vertical difference h between two points A and B if a conventional stretched wire sensor is used for the measurement.

What is claimed is:

1. A device for determining from pressure measurements the vertical distance between at least two positions situated at different heights, said device comprising:
   a first flexible tube having a first end and a second end and adapted for filling with a fluid having a density different from that of air, with the first end of the first flexible tube at one of the two positions and the second end of the first flexible tube at the other of the two positions;
   a second flexible tube having a first end and a second end and adapted for filling with gas, with the first end of the second flexible tube at said one of the two positions and second end of the second flexible tube at said other of the two positions;
   a first differential pressure sensor for measuring the differences between the pressures prevailing at said first ends of said first and second tubes;
   a second differential pressure sensor for measuring the differences between the pressures prevailing at said second ends of said first and second tubes;
   balancing means for maintaining at a substantially constant value the static pressure difference prevailing between a point in the first tube and a point in the second tube; and
   means for converting the pressure differences measured by said first and second differential pressure sensors into a measurement of the vertical distance between the two positions.

2. The device as claimed in claim 1, wherein said balancing means comprise a membrane accumulator for separating fluid and gas and balancing the variations of their respective static pressures.

3. The device as claimed in claim 1 or 2, further comprising means for summing measurement signals produced by the two sensors.

4. The device as claimed in claim 3, further comprising means for fixing the first end of each of the two flexible tubes at a first position kept substantially stable in altitude by a heave compensation system associated with a floating installation subjected to heaving; and means for fixing the second end of each of the two flexible tubes at a second position subjected to the heaving.

5. The device as claimed in claim 2, further comprising a filtering element interposed between said first tube and said membrane accumulator.

6. The device as claimed in claim 1, 2, or 5, further comprising means for fixing the first end of each of the two flexible tubes at a first position kept substantially stable in altitude by a heave compensation system associated with a floating installation subjected to heaving; and means for fixing the second end of each of the two flexible tubes at a second position subjected to the heaving.

* * * * *